United States Patent
Schleichert et al.

(10) Patent No.: US 9,180,759 B2
(45) Date of Patent: Nov. 10, 2015

(54) IMPACT BEAM

(71) Applicants: Edward Schleichert, Sailauf (DE); Oliver Kostka, Sailauf (DE)

(72) Inventors: Edward Schleichert, Sailauf (DE); Oliver Kostka, Sailauf (DE)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/014,227

(22) Filed: Aug. 29, 2013

(65) Prior Publication Data
US 2014/0062133 A1    Mar. 6, 2014

(30) Foreign Application Priority Data
Sep. 3, 2012   (DE) .................. 10 2012 215 595

(51) Int. Cl.
*B60J 5/04*    (2006.01)
*B23K 11/26*   (2006.01)

(52) U.S. Cl.
CPC ............. *B60J 5/0444* (2013.01); *B23K 11/26* (2013.01); *B60J 5/0461* (2013.01); *B23K 2201/006* (2013.01); *Y10T 29/49622* (2015.01)

(58) Field of Classification Search
CPC ........ B60J 5/042; B60J 5/0422; B60J 5/0425; B60J 5/0426; B60J 5/0429; B60J 5/0433; B60J 5/0444; B60J 5/0445; B60J 5/0468
USPC ............... 296/146.5, 146.6, 187.12; 293/102; 29/897.2
See application file for complete search history.

(56) References Cited

U.S. PATENT DOCUMENTS

| | | | | |
|---|---|---|---|---|
| 5,056,861 A * | 10/1991 | Garnweidner et al. | .. | 296/187.12 |
| 6,227,609 B1 * | 5/2001 | Mellis | ........................ | 296/146.6 |
| 6,389,697 B1 * | 5/2002 | Benoit et al. | ................. | 29/897.2 |
| 6,554,345 B2 * | 4/2003 | Jonsson | ..................... | 296/146.6 |
| 6,591,577 B2 | 7/2003 | Goto et al. | | |
| 6,622,450 B2 * | 9/2003 | Nees et al. | .................... | 296/202 |
| 6,663,169 B2 * | 12/2003 | Gehringhoff et al. | .... | 296/187.12 |
| 6,817,652 B2 * | 11/2004 | Graber et al. | .............. | 296/146.6 |
| 6,863,321 B2 * | 3/2005 | Jonsson et al. | ................ | 293/102 |
| 6,869,130 B2 * | 3/2005 | Bodin et al. | ............... | 296/146.6 |
| 7,086,686 B2 * | 8/2006 | Bullmann et al. | ......... | 296/146.6 |
| 7,316,446 B2 * | 1/2008 | Wikstrom | .................. | 296/146.6 |
| 7,347,486 B2 * | 3/2008 | Uchida et al. | ............. | 296/187.03 |
| 7,566,091 B2 * | 7/2009 | Yagi | ............................. | 296/146.6 |
| 7,637,555 B2 * | 12/2009 | Kameoka | .................... | 296/146.6 |
| 7,819,462 B1 * | 10/2010 | Owens | ........................ | 296/146.6 |
| 8,061,762 B2 * | 11/2011 | Arvidsson et al. | ......... | 296/146.6 |
| 8,299,399 B2 * | 10/2012 | Cornelius et al. | ............. | 219/149 |
| 8,544,935 B2 * | 10/2013 | Wille et al. | ................ | 296/146.6 |
| 8,602,483 B2 * | 12/2013 | Svedberg et al. | .......... | 296/146.6 |
| 2003/0222056 A1 * | 12/2003 | Salzer et al. | .................. | 219/116 |
| 2004/0033732 A1 * | 2/2004 | Koch, Jr. | ....................... | 439/843 |
| 2008/0120844 A1 * | 5/2008 | Yang et al. | .................... | 29/897.2 |

(Continued)

FOREIGN PATENT DOCUMENTS

| | | | | |
|---|---|---|---|---|
| DE | 4133144 A1 | 4/1992 | | |
| WO | WO 2009/016602 | * | 2/2009 | ............. B62K 11/11 |

*Primary Examiner* — Gregory Blankenship
(74) *Attorney, Agent, or Firm* — Dickinson Wright PLLC

(57) ABSTRACT

An impact beam for a motor vehicle body, and more particularly to a side impact beam for a side door of a motor vehicle body is provided. The impact beam has a first profiled section with a three-dimensional structure and a second component which spatially closes the first profiled section. The two components have overlapping surfaces used for welding, and the welding is carried out by way of impulse capacitor discharge welding.

7 Claims, 3 Drawing Sheets

(56) References Cited

U.S. PATENT DOCUMENTS

| | | | |
|---|---|---|---|
| 2010/0242284 A1* | 9/2010 | Danaj et al. | 29/897.2 |
| 2014/0062132 A1* | 3/2014 | Schleichert | 296/187.12 |
| 2014/0062133 A1* | 3/2014 | Schleichert et al. | 296/187.12 |
| 2014/0077522 A1* | 3/2014 | Schleichert et al. | 296/146.6 |

* cited by examiner

IMPACT BEAM

CROSS REFERENCE TO RELATED APPLICATION

This U.S. Patent Application claims the benefit of DE patent application Ser. No. 10 2012 215 595.3 filed Sep. 3, 2012, entitled "Impact Beam," the entire disclosure of the application being considered part of the disclosure of this application, and hereby incorporated by reference.

BACKGROUND OF THE INVENTION

1. Field of the Invention

The invention relates to an impact beam for a motor vehicle body, in particular to a side impact beam for a side door of a motor vehicle body, comprising a first profiled section having a three-dimensional structure and a second component that spatially closes the first profiled section.

Impact beams of the type in question are used in various locations of a motor vehicle body. They can be found as bumper brackets, pillar reinforcements for an A-pillar, B-pillars or C-pillars, as cockpit cross members, or also as bumper cross members, optionally in conjunction with crash boxes. A particular field of use for the types of impact beams in question is as side doors of motor vehicles. There, such an impact beam is provided as a side impact protection device in the region of the door frame.

The present invention relates to impact beams for motor vehicle bodies in general. The exemplary embodiment of the invention is a side impact beam for a side door of a motor vehicle body. The impact beam of the exemplary embodiment is configured to offer effective protection for the interior space of the motor vehicle body relative to the direction of any anticipated impact, which is essentially transversely to the longitudinal extension of the impact beam and to allow connection to the associated structural component of the motor vehicle body.

2. Description of the Prior Art

It is already known to use a hollow profiled section made of steel or aluminum as an impact beam for a motor vehicle body, wherein starting from a pipe, the hollow profiled section is designed as a single-piece profiled steel section having high strength, robustness and deformation work, the end regions of the section being designed in a tab-like manner for attachment to the structural component, in particular in the motor vehicle door (DE 41 33 144 A1). The pipe can have a round, oval, or elliptical cross-section. It may also be possible for two pipes to be disposed next to each other relative to the direction of any anticipated impact.

An impact beam for a motor vehicle body, comprising two profiled pipe sections disposed next to each other relative to the direction of any anticipated impact, has already been further developed from a manufacturing point of view such that both profiled pipe sections are integrally formed of steel strip that has been brought into the target cross-sectional form by way of a roll forming method, wherein the steel strip forming the profiled pipe sections is fixed at the connecting points by a longitudinal seam weld joint (U.S. Pat. No. 6,591,577 B2).

It is also known not to produce the profiled sections as closed pipes, but to form them from sheet steel in the shape of a hat, such that the structures have a double hat form. The profiled sections are closed with a cover so as to create greater stability and rigidity.

SUMMARY OF THE INVENTION

The impact beam produced from steel strip for side impact protection, from which the invention proceeds, has flat sections at the ends for joining in the profiled component, with the one or both parallel hat profiles developing from these sections. These profiled sections have a symmetrical design and have a boundary surface extending along the longitudinal axis of the profiled section. The free longitudinal edges of the metal sheet and of the cover are disposed so as to overlap with each other and are joined by way of a longitudinal seam weld joint. In the prior art, the longitudinal seam weld joint is implemented as a laser weld seam, MAG weld seam, and in particular as a spot weld seam.

The problem underlying the teaching is that of configuring the known impact beam for a motor vehicle body, which is produced from a strip-shaped metal sheet in a forming process and further developing it so that as uniform and continuous as possible of a force absorption is assured and so that the production process is optimized.

The solution according to the invention uses an impulse capacitor discharge welding method for closing the profiled section, with this method having previously only been employed for smaller components.

Previously, the impulse capacitor discharge welding method could only be used conditionally, because the capacitor must be dimensioned larger with increasing length of the weld seam. For example, weld seam length measuring 500 mm to 1000 mm requires the use of a capacitor with one million ampere.

The method is also advantageous because no discoloration of the weld joint on the surface is apparent.

As a result of appropriate developments in equipment technology, it is now also possible to economically implement larger joint cross-sections.

The impact beam is advantageously formed of two components, which have surfaces that are welded together.

In one advantageous embodiment, one of the components forms a cover on the other component.

However, it is also advantageous to provide both components with a three-dimensional structure.

One embodiment has a double hat structure for advantageous rigidity.

To produce an optimized joint, weld grooves are provided on at least one component.

It shall be regarded as advantageous that the lengths of the weld seams add up to a total length (L2), which corresponds to at least half the length of the profiled section (L1).

BRIEF DESCRIPTION OF THE DRAWINGS

Advantageous embodiments of the invention will be described in greater detail in the following figures and the description.

DESCRIPTION OF THE ENABLING EMBODIMENT

Figure 1:
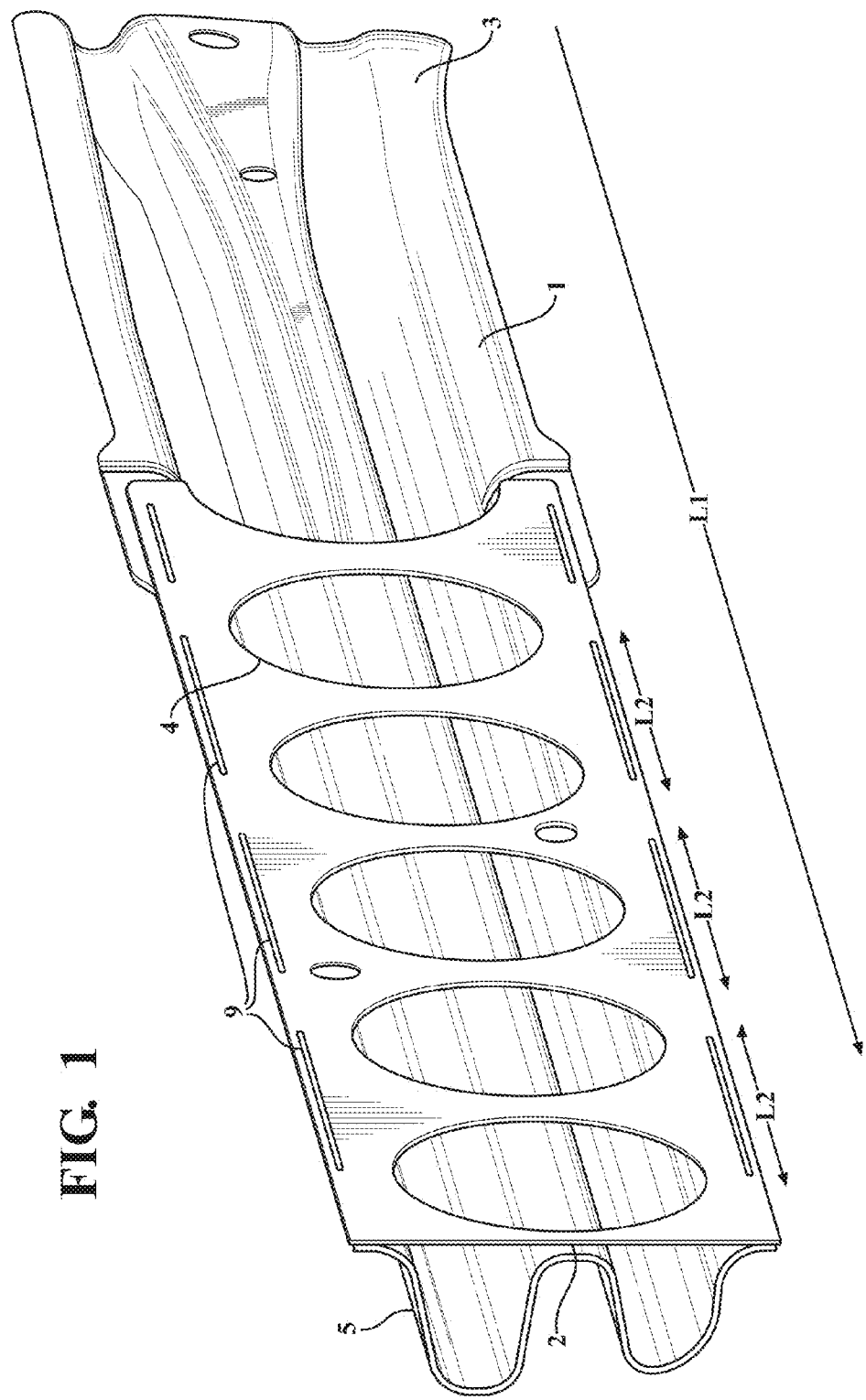
FIG. 1 shows a view onto an exemplary impact beam.

FIG. 1 shows an exemplary embodiment of an impact beam. A first profiled section 1 extends along the entire length L1 of the impact beam. On the right side of the drawing, it is visible that the profiled section is flattened to form an end piece 3, which simplifies the installation.

As shown, the profiled section forms a double W-shaped channel 5, which extends from the first end piece 3 to the second end piece (not shown). The profiled section 1 is covered by a second component 2, which in this embodiment has a plurality of cut-outs 4. The two components are joined to each other at the edges by way of weld seams which extend with minor interruptions along the longitudinal axis of the profiled section and of the cover and together form a weld seam having the length L2, which represents more than ⅔ of the length L1.

Figure 2:
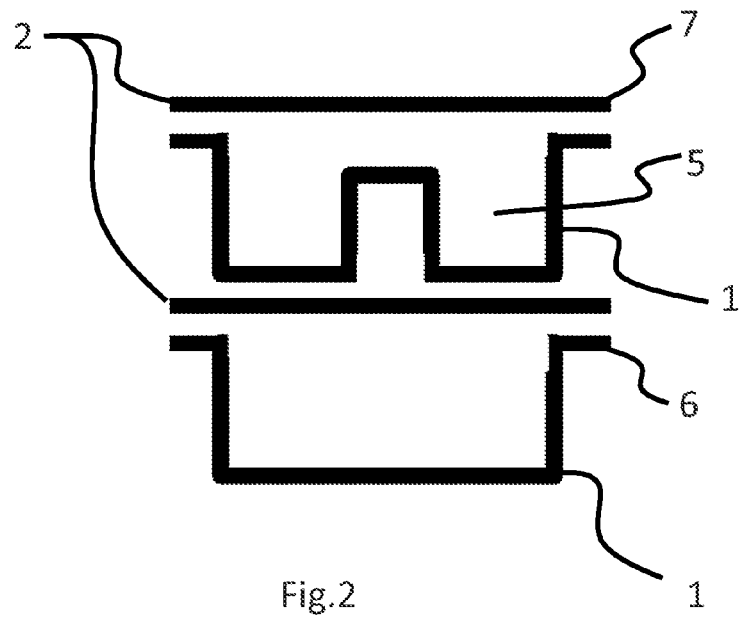
FIG. 2 shows sections through two embodiments.

FIG. 2 shows cross-sections through two examples, with the profiled section 1 having a single or double hat shape. The second component 2 is designed as a flat cover.

The profiled section 1 forms a first welding surface 6, which is located opposite a second welding surface 7 formed by the cover.

The solution according to the invention uses an impulse capacitor discharge welding method for closing the profiled section, with this method having previously only been employed for smaller components. The method is one variant of resistance welding for electrically conductive materials based on the Joule effect of an electric current flowing through the joining site.

This heats the joining partners until they melt. After the flow of current, a welded joint develops after the melt has re-solidified. Pressing the profiled section and the second component 2 together during and after the flow of current supports the formation of a close joint during resistance welding.

Impulse capacitor discharge welding, or CD welding, differs from conventional resistance welding.

The energy is delivered to the workpiece by charged capacitors. Advantages of this method include very high welding currents, a steep rate of current rise, a short welding time and due to the concentration of energy, a smaller heat affected zone in the component that are joined together. This also enables safe welding of high-strength steels. One of greatest advantages of this type of welding is that, due to the fast rate of current rise and the attendant fast transfer of heat into the weld geometry, the process temperature at the welding site is reached before the surrounding material can heat up.

To be able to optimally use the impulse capacitor discharge welding method, the impact beams are provided with a weld groove 8 which increases the contact of the two surfaces 6 and 7 and assures the position of the weld joint because the site of the current through-flow is defined by the weld groove 8.

Figure 3:
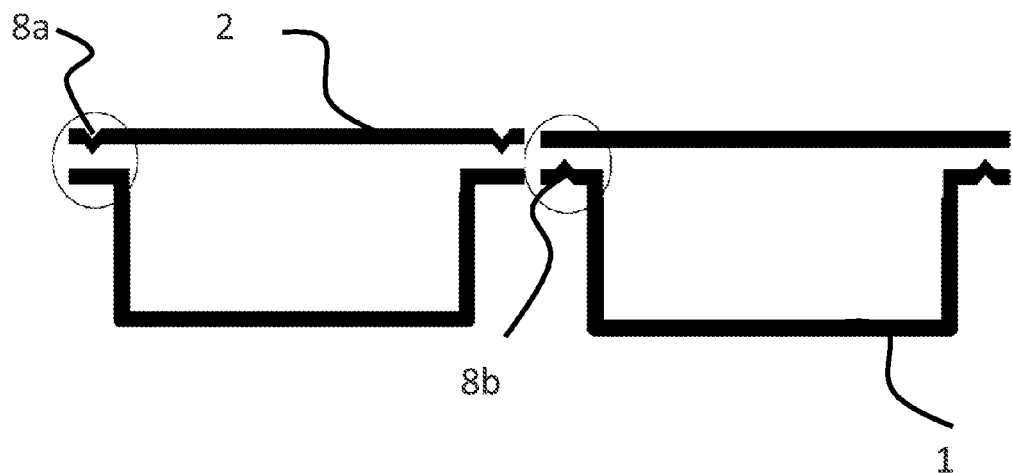
FIG. 3 shows an advantageous configuration of the impact beam.

The weld grooves 8*a*, 8*b* are provided as shown in FIG. 3 either on the side of the cover 2 on the surface 7, or on the profiled section side on the first welding surface 6.

Figure 4:
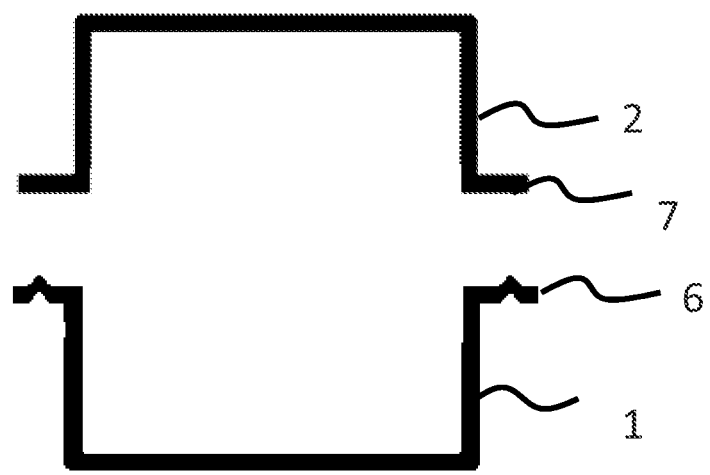
FIG. 4 shows another embodiment.

FIG. 4 shows one embodiment in which both components to be welded together are formed as three-dimensional components so as to create an impact beam having optimized properties.

The impact beams can be produced considerably more quickly and cost-effectively with the proposed impulse capacitor discharge welding method as compared to other methods.

The invention claimed is:

1. A side impact beam for a side door of a motor vehicle body comprising:
    a first profiled section having a three-dimensional structure;
    a second component, the first profiled section and the second component having spaced apart and distinct overlapping surfaces used for welding, wherein the second component closes the first profiled section between the spaced apart overlapping surfaces, and wherein the welding is carried out as impulse capacitor discharge welding; and
    wherein at least one of the weld seams extends in a longitudinal direction at least half the length of the first profiled section.

2. The impact beam according to claim 1, wherein the second component is designed as a virtually flat cover.

3. The impact beam according to claim 1, wherein the second component likewise has a three-dimensional structure.

4. The impact beam according to claim 1, wherein at least one of the first profiled section and the second component has a double hat structure.

5. The impact beam according to claim 1, wherein the first profiled section and the second component are made of steel as stampings and pressed parts.

6. The impact beam according to claim 1, wherein the overlapping surfaces include weld grooves.

7. A method for producing a side impact beam for a side door of a motor vehicle body, the method comprising the steps of:
    preparing a first profiled section having a three-dimensional structure and a second component,
    positioning the second component to spatially close the first profiled section such that the first profiled section is spatially closed between spaced apart and distinct overlapping surfaces of the first profiled section and the second component, and
    impulse capacitor discharge welding the overlapping surfaces of the first profile section and the second component together to produce weld seams and wherein at least one of the weld seams extends in a longitudinal direction at least half the length of the profiled section.

* * * * *